S. O. R. HARRIS.
Churn.

No, 213,195.  Patented Mar. 11, 1879.

WITNESSES  INVENTOR.
Robert Everett,  Stephen O. R. Harris.
James J. Sheehy,  By Gilmore, Smith & Co.
ATTORNEYS.

UNITED STATES PATENT OFFICE.

STEPHEN O. R. HARRIS, OF WILSONVILLE, KANSAS.

IMPROVEMENT IN CHURNS.

Specification forming part of Letters Patent No. 213,195, dated March 11, 1879; application filed October 12, 1878.

*To all whom it may concern:*

Be it known that I, STEPHEN O. R. HARRIS, of Wilsonville, in the county of Bourbon and State of Kansas, have invented a new and valuable Improvement in Churns; and I do hereby declare that the following is a full, clear, and exact description of the construction and operation of the same, reference being had to the annexed drawings, making a part of this specification, and to the letters and figures of reference marked thereon.

Figure 1:
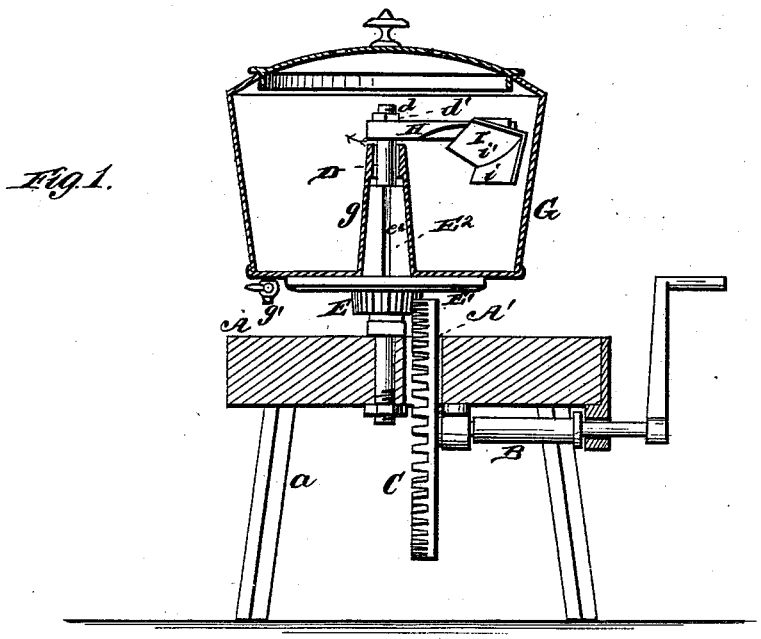
Figure 2:
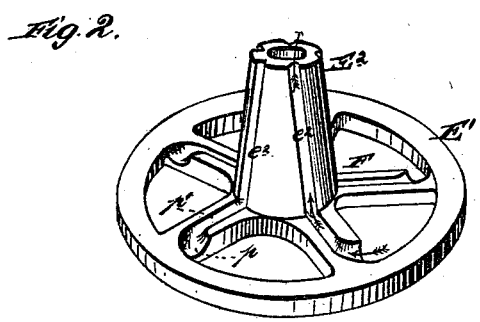

Figure 1 of the drawings is a transverse section of my churn, and Fig. 2 is a perspective detail view of the same.

My invention relates to a rotary churn; and the novelty consists in the construction and arrangement of parts, as will be more fully hereinafter set forth, and pointed out in the claim.

Within a suitable bench or frame I journal a shaft, upon which is hung a gear-wheel and a crank. A spindle, rigid with the bench, extends upward and receives a combined conical sleeve, horizontal wheel, and a gear. The gear meshes with the driving gear-wheel, the horizontal wheel acts as a support for the churn, and the conical sleeve is received into a corresponding socket in the center of the churn, and is provided with vertical grooves to allow a passage of air. To the upper end of the vertical spindle I secure by bolt and nut a horizontal stationary arm, upon which is hung an adjustable scoop, which, acting upon the revolving cream, dashes it to the opposite side downward. The churn revolves from its friction on the revolving horizontal wheel.

Referring to the drawings, A represents the table, resting upon legs $a$, and B the driving-shaft, journaled therein. C represents the gear-wheel, which extends up through a slot, $A'$, in the bench, and D the rigid vertical spindle, having a threaded upper end, $d$, to receive a nut, $d'$.

E represents a pinion; $E^1$, a horizontal wheel, and $E^2$ a sleeve of conical form, provided with vertical grooves $e^2$, to serve as air-passages. These revolving portions E $E^1$ $E^2$ are preferably made in one piece, which revolves around the spindle D.

G is the churn, of circular form, and it is provided with a socket, $g$, to receive the spindle D and sleeve $E^2$, and with an outlet-cock, $g'$. It is provided with a suitable ventilated cover, and has its bearing upon the horizontal wheel $E^1$.

An arm, H, is secured to the upper end of the spindle by the nut $d'$, and to this arm is adjustably secured a dasher or scoop, I, having inwardly-inclined side $i$, to throw the revolving cream inward, and a downward-inclined surface, $i'$, which serves to throw the cream downward into the milk.

It is always desirable to have fresh air in the churn; and to this end I construct the wheel $E^1$ with spokes F, from one side of each of which a flaring mouth, $p$, leads to a channel, $p'$, in the spokes, which channel in turn leads to the grooves in the conical sleeve $E^2$. Thus fresh air is taken up by the revolutions of the wheel in one direction, and forced up through the open-capped socket $g$, and out through the perforations in the cover.

What I claim as new, and desire to secure by Letters Patent, is—

The pinion E, bearing-wheel $E^1$, provided with spokes F and openings $p$ $p'$, and conical sleeve $E^2$, having vertical grooves or air-passages $e^2$, and the stationary dasher secured at the upper end of the same, in combination with the driving-wheel C and churn G, having conical socket $g$, as specified.

In testimony that I claim the above I have hereunto subscribed my name in the presence of two witnesses.

STEPHEN O. R. HARRIS.

Witnesses:
G. H. REQUA,
S. C. HARRIS.